United States Patent
Huang et al.

(10) Patent No.: US 7,024,727 B1
(45) Date of Patent: Apr. 11, 2006

(54) COUPLING STRUCTURE

(75) Inventors: Chao-Ming Huang, Taipei (TW);
Wen-Chieh Wang, Taipei (TW);
Chin-Ku Chuang, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 11/041,196

(22) Filed: Jan. 25, 2005

(30) Foreign Application Priority Data

Oct. 15, 2004 (TW) ............................... 93131419 A

(51) Int. Cl.
*E05D 7/00* (2006.01)
(52) U.S. Cl. ......................................... 16/354; 16/367
(58) Field of Classification Search .................. 16/354, 16/367; 248/917, 920; 455/575.1, 575.3; 379/433.13, 434; 361/683, 803
See application file for complete search history.

(56) References Cited

U.S. PATENT DOCUMENTS

| | | | |
|---|---|---|---|
| 6,587,333 B1 * | 7/2003 | Tseng et al. | 361/681 |
| 6,694,570 B1 * | 2/2004 | Chen | 16/367 |
| 6,742,221 B1 * | 6/2004 | Lu et al. | 16/367 |
| 6,804,861 B1 * | 10/2004 | Hsu | 16/366 |
| 6,845,546 B1 * | 1/2005 | Lu et al. | 16/367 |
| 6,850,407 B1 * | 2/2005 | Tanimoto et al. | 361/681 |
| 6,867,961 B1 * | 3/2005 | Choi | 361/681 |
| 6,883,206 B1 * | 4/2005 | Yang et al. | 16/337 |
| 6,931,954 B1 * | 8/2005 | Jinbo | 74/64 |
| 6,958,902 B1 * | 10/2005 | Tseng et al. | 361/681 |
| 2003/0167600 A1 * | 9/2003 | Chien et al. | 16/367 |
| 2004/0018862 A1 * | 1/2004 | Godston et al. | 455/575.3 |

* cited by examiner

*Primary Examiner*—Chuck Y. Mah
*Assistant Examiner*—Mark T. Vogelbacker
(74) *Attorney, Agent, or Firm*—Bacon & Thomas, PLLC

(57) ABSTRACT

A coupling structure coupled between a base and a display panel is disclosed to include a pivot structure fixedly fastened to the base, a rotary platform pivotally coupled to the pivot structure for allowing rotation of the rotary platform on the pivot structure, a gear set, which includes a center gear fixedly fastened to the pivot structure and a left-side gear and a right-side gear pivotally mounted inside the rotary platform and meshed with the center gear at two sides respectively, the left-side and right-side gears each having the same number of teeth and a raised portion, and a hinge member, which is received inside the rotary platform and fixedly fastened to the display panel and has two elongated blind holes respectively coupled to the raised portions of the left-side gear and right-side gear.

7 Claims, 6 Drawing Sheets

COUPLING STRUCTURE

BACKGROUND OF THE INVENTION

1. Field of the Invention

The present invention relates to a coupling structure for use in a dual-use portable computer and more particularly, to such a coupling structure, which allows the display panel of the dual-use portable computer to be moved relative to the base and rotated on the base to set the portable computer between the notebook form and the tablet PC form.

2. Description of Related Art

A regular dual-use portable computer generally comprises a base carrying a keyboard, and a display panel pivotally coupled to the base and rotatable relative to the base. When the display panel is set in the position with the display screen facing to the base, the portable computer is used as a notebook computer. On the contrary, when the display panel is closed on the base with the display screen set opposite to the base, the portable computer is used as a tablet PC for data input through a touch pen.

For allowing the display panel to be rotated relative to the base, a swivel mechanism is provided and coupled between the display panel and the base. This swivel mechanism is a round structure and has a circular form which is coupled between the base and the display panel and protruding over the top side of the base. Further, a hinge is mounted to the swivel mechanism for allowing the display panel to be turned relative to the base between the close position and the open position. The position of the hinge changes with rotary motion of the swivel mechanism. After a rotary motion of the display panel relative to the base, the position of the display panel is biased relative to the base, thereby causing the display panel unable to cover the top side of the base completely, and an space is left above the top side of the base at one side of the display panel. Further, the hinge of this design is not steady and will vibrate when the user turning the display panel relative to the base.

SUMMARY OF THE INVENTION

The present invention has been accomplished under the circumstances in view. It is therefore the main object of the present invention to provide a space-saving and steady coupling structure for use in a dual-use portable computer to allow a display panel of the dual-use portable computer to be moved relative to a base of the dual-use portable computer and rotated on the base to set the portable computer between the notebook form and the tablet PC form. The coupling structure is comprised of a pivot structure, a rotary platform, a gear set, and a hinge member. The pivot structure is fixedly fastened to a top side of the base. The rotary platform comprises a pivot member pivotally coupled to the pivot structure for allowing rotation of the rotary platform on the pivot structure, an open chamber, and a guide structure. The gear set is arranged inside the open chamber of the rotary platform, comprising a center gear coaxially fixedly fastened to the pivot structure, a left-side gear pivotally mounted in the rotary platform and meshed with the center gear at one side, and a right-side gear pivotally mounted in the rotary platform and meshed with the center gear at one side opposite to the left-side gear. The left-side gear and the right-side gear have the same number of teeth. At least one of the left-side gear and the right-side gear has a raised portion. The hinge member is received inside the open chamber of the rotary platform and fixedly fastened to the display panel, having at least one elongated blind hole disposed in a bottom face thereof and coupled to the at least one raised portion at the left-side gear and the right-side gear, and a guide structure coupled to the guide structure of the rotary platform. When rotating the rotary platform on the pivot structure, the center gear drives the left-side gear and the right-side gear to rotate around the center gear, thereby causing the at least one raised portion to drive the at least one elongated blind hole of the hinge member to move along the guidance of the guide structure of the hinge member and the guide structure of the rotary platform.

By means of the aforesaid structural design, rotating the rotary platform relative to the pivot structure at the base causes the hinge member to slide relative to the rotary platform. Unlike the aforesaid conventional swivel mechanism, the present invention fully utilizes limited installation space. After rotary motion, the display panel moves linearly with the hinge member relative to the rotary platform, and therefore the display panel will not bias and can cover the top side of the base completely.

Further, in the aforesaid coupling structure, the pivot structure can be a pivot shaft fixedly fastened to the rear side of the top side of the base, and the pivot member of the rotary platform can be a barrel sleeved onto the pivot shaft.

In the aforesaid coupling structure, the guide structure of the rotary platform comprises two ribs arranged in parallel inside the open chamber at two sides relative to the gear set, and the guide structure of the hinge member comprises two sliding grooves respectively coupled to the ribs of the guide structure of the rotary platform.

The guide structure of the rotary platform also can comprise two guide rods arranged in parallel inside the open chamber, and the guide structure of the hinge member also can comprise two axle holes respectively coupled to the guide rods for guiding movement of the hinge member along the guide rods.

The coupling structure further comprises a gear damper covered on the rotary platform over the gear set. The gear damper comprises at least one arched sliding slot respectively coupled to the at least one raised portion.

The coupling structure further comprises at least one positioning wheel mounted in the top side of the base, and two locating holes formed in the rotary platform in two opposite sides optionally corresponding to the at least one positioning wheel for positioning.

DETAILED DESCRIPTION OF THE PREFERRED EMBODIMENT

Figure 1:
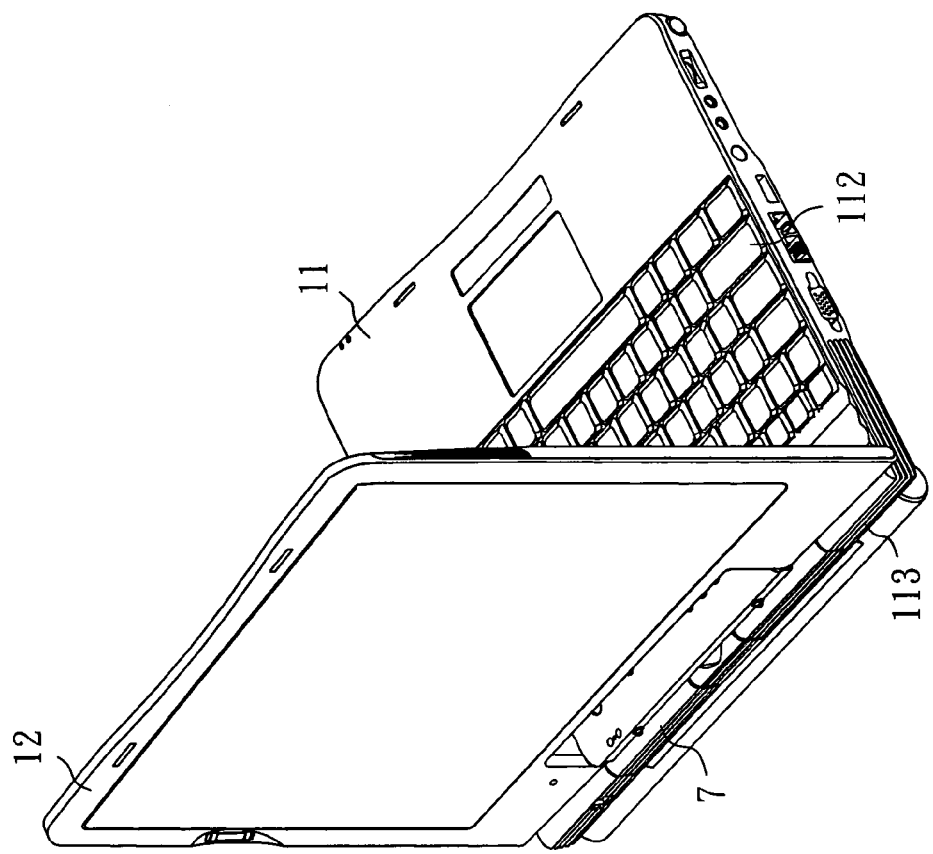
FIG. 1 is an applied view showing a coupling structure installed in a dual-use portable computer according to the present invention.
Figure 2:
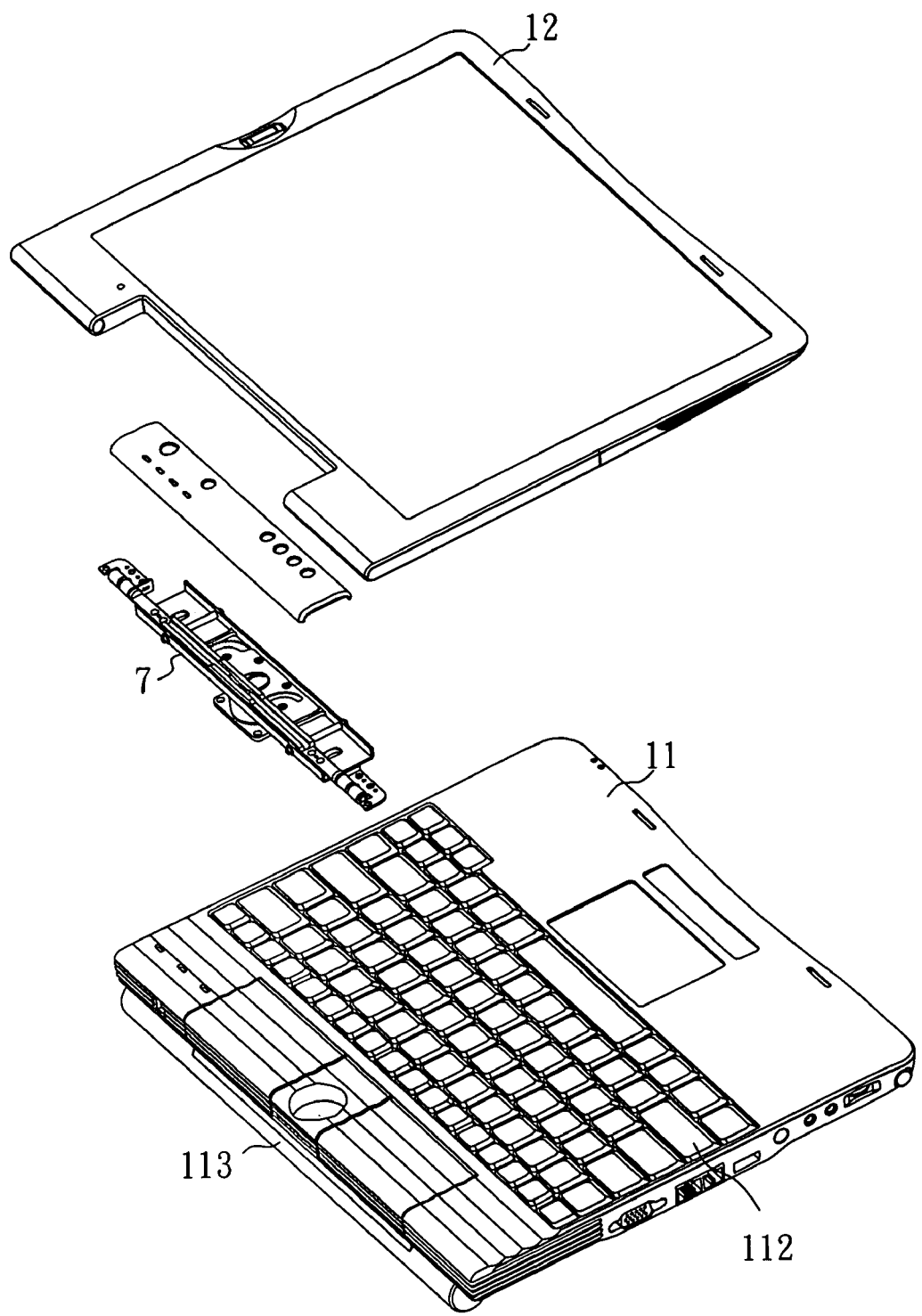
FIG. 2 is an exploded view of FIG. 1.

Referring to FIG. 1 and FIG. 2, a coupling structure 7 is shown coupled between a base 11, which carries a keyboard 112, and a display panel 12 of a dual-use portable computer, for enabling the display panel 12 to be turnable about an axis relative to the base 11 and rotatable on the base 11 to set the dual-use portable computer between the form of a notebook and the form of a tablet PC.

Figure 3:
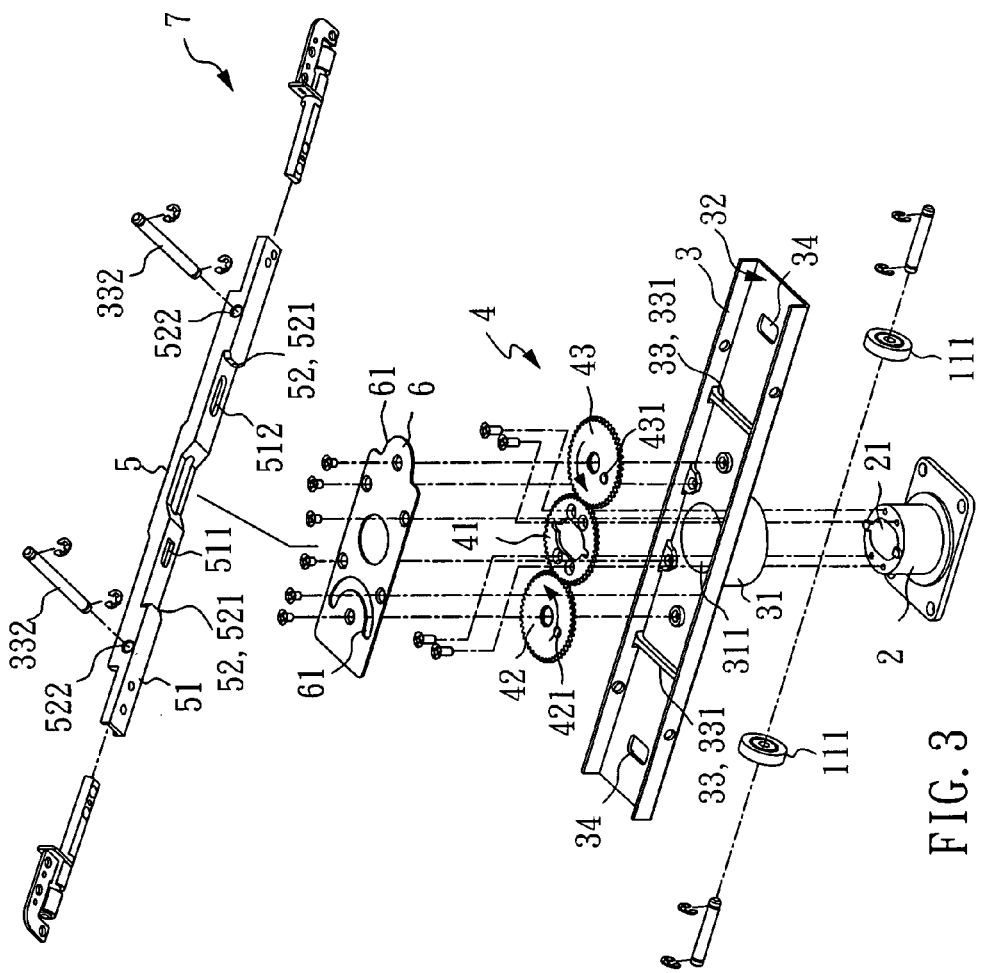
FIG. 3 is an exploded view of the coupling structure according to the present invention.

Referring to FIG. 3 and FIG. 1 and FIG. 2 again, the coupling structure 7 comprises a pivot structure 2, a rotary platform 3, a gear set 4, a hinge member 5, and a gear damper 6. The pivot structure 2 is fixedly upwardly fastened to a top side of a rear side 113 of the base 11, having an axially extending center through hole 21. The rotary platform 3 has a pivot member 31 downwardly extending from the bottom face thereof at the center. According to this embodiment, the pivot structure 2 is a pivot shaft, the pivot member 31 is a barrel sleeved onto the pivot shaft of the pivot structure 2 for allowing rotation of the rotary platform 3 on the pivot structure 2. The rotary platform 3 has a center through hole 311 extending through the barrel of the pivot member 31 corresponding to the center through hole 21 of the pivot shaft of the pivot structure 2.

The rotary platform 3 further comprises an open chamber 32 and a guide structure 33 extended inside the open chamber 32. According to this embodiment, the guide structure 33 comprises two ribs 331 arranged in parallel at two sides relative to the center through hole 311, and two guide rods 332 arranged in parallel at two sides relative to the ribs 331.

The gear set 4 is arranged inside the open chamber 32 of the rotary platform 3 between the ribs 331 and the guide rods 332, comprising a center gear 41, a left-side gear 42, and a right-side gear 43. The center gear 41 is coaxially fixedly fastened to the pivot structure 2. The left-side gear 42 and the right-side gear 43 are pivotally mounted in the open chamber 32 and meshed with the center gear 41 at two sides. The left-side gear 42 and the right-side gear 43 have the same number of teeth for synchronous rotation at the same speed. Further, the left-side gear 42 and the right-side gear 43 each have a raised portion 421 and 431.

The gear damper 6 is fastened to the rotary platform 3 and covered over the gear set 4, having two arched sliding slots 61 respectively coupled to the raised portions 421, 431 of the left-side gear 42 and the right-side gear 43.

Further, the hinge member 5 is a narrow elongated member received inside the open chamber 32 of the rotary platform 3 and fixedly fastened to the bottom side of the display panel 12, having two elongated blind holes 511, 512 in the bottom face 51 corresponding to the raised portions 421, 431 of the left-side gear 42 and the right-side gear 43, and a guide structure 52. The guide structure 52 of the hinge member 5 comprises sliding grooves 521 corresponding to the ribs 331 of the guide structure 33 of the rotary platform 3 respectively, and two axle holes 522, which receives the guide rods 332 of the guide structure 33 of the rotary platform 3 respectively.

The electric wiring (not shown) of the display panel 12 extends through the center through hole 311 of the barrel of the pivot member 31 of the rotary platform 3 and the center through hole 21 of the pivot shaft of the pivot structure 2 to the inside of the base 11.

Figure 4:
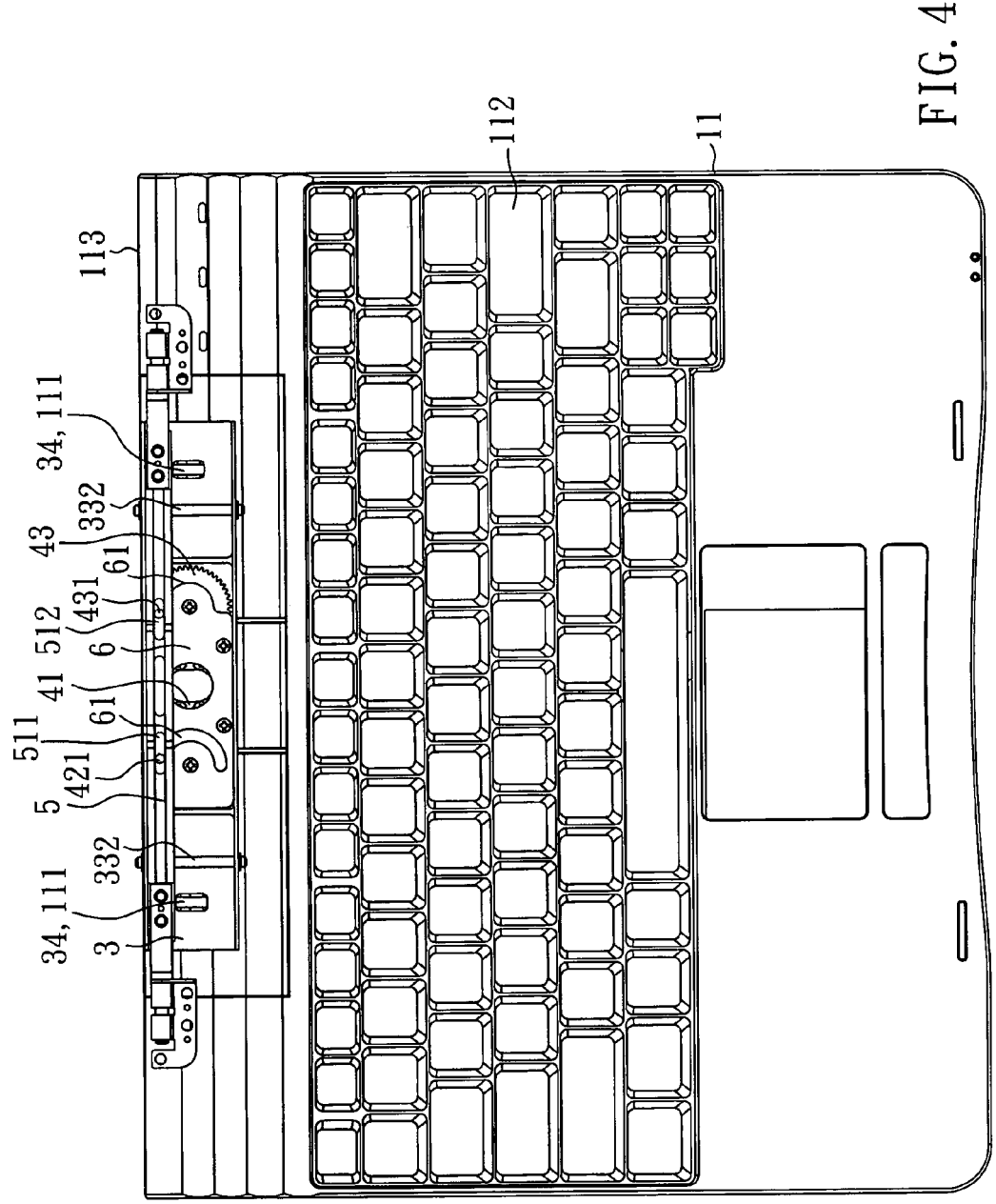
FIG. 4 is a top view showing the coupling structure in the initial position before action.
Figure 5:
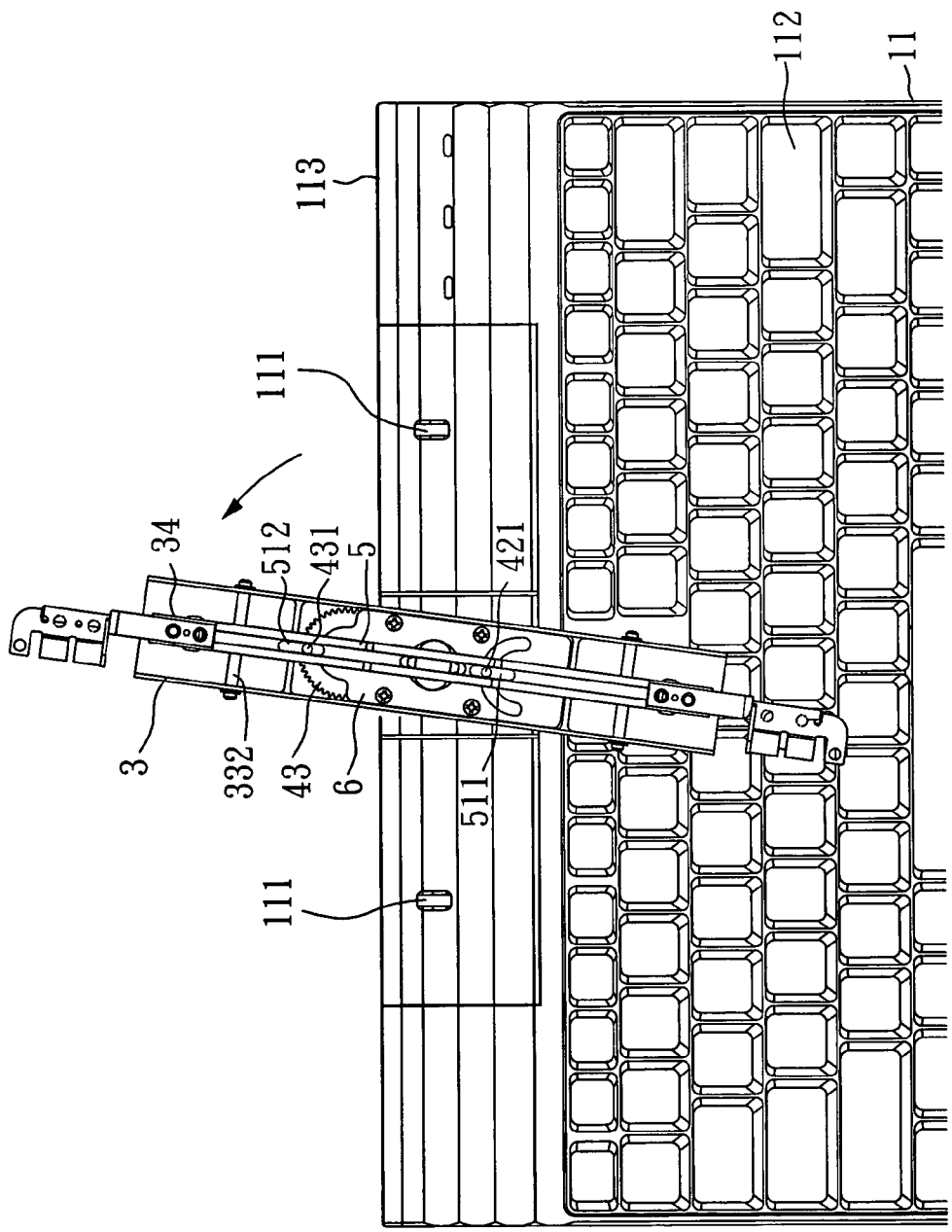
FIG. 5 is a top view showing the coupling structure in action.
Figure 6:
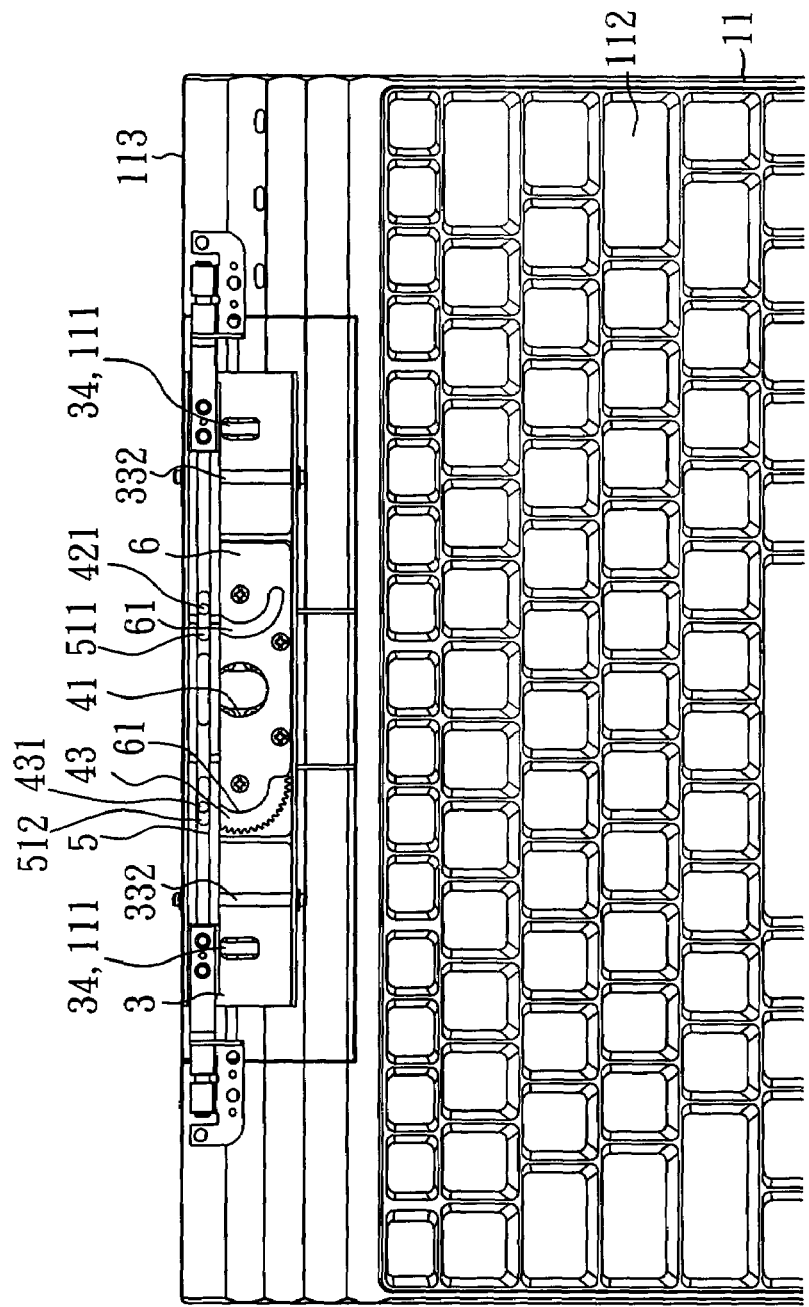
FIG. 6 is a top view of the coupling structure after action.

Referring to FIG. 4, FIG. 5 and FIG. 1 and FIG. 3 again, when wishing to change the dual-use portable computer from the notebook form to the tablet PC form or from the tablet PC form to the notebook form, the display panel 12 and the coupling structure 7 are in the initial position as shown in FIG. 4. Thereafter, the display panel 12 must be rotated relative to the base 11. By means of the coupling structure 7, the rotary platform 3 can be rotated with the barrel of the pivot member 31 on the pivot shaft of the pivot structure 2. At this time, the center gear 41 drives the left-side gear 42 and the right-side gear 43 to rotate around the center gear 41. Because the left-side gear 42 and the right-side gear 43 have the same number of teeth, they rotate around the center gear 41 at the same speed. During rotated of the left-side gear 42 and the right-side gear 43 around the center gear 41, the raised portions 421, 431 of the left-side gear 42 and the right-side gear 43 drive the elongated blind holes 511, 512 of the hinge member 5 to let the hinge member 5 move along the guidance of the ribs 331 and guide rods 332 of the guide structure 33 of the rotary platform 3, thereby causing the hinge member 5 to be rotated with the rotary platform 3, and therefore the display panel 12 is rotated with the hinge member 5 and the rotary platform 3 to the position shown in FIG. 6.

By means of the aforesaid structural design, rotating the rotary platform 3 relative to the pivot structure 2 at the base 11 causes the hinge member 5 to slide relative to the rotary platform 3. Unlike conventional swivel mechanism, the invention fully utilizes limited installation space. After rotary motion, the hinge member 5 does not change its position (see FIG. 4 and FIG. 6), i.e., the display panel 12 moves linearly with the hinge member 5 after rotation, and therefore the display panel 12 will not bias and can cover the top side of the base 11 completely.

Further, in order to smoothen rotation and ensure positive positioning, two positioning wheels 111 are mounted in the top side of the base 11, and two locating holes 34 are formed in the rotary platform 3 corresponding to the positioning wheels 111.

Further, because the raised portions 421, 431 of the left-side gear 42 and the right-side gear 43 are respectively engaged into the elongated blind holes 511, 512 in the bottom face 51 of the hinge member 5, the display panel 12 which is fixedly fastened to the hinge member 5 is stably supported on the gear set 4.

Although the present invention has been explained in relation to its preferred embodiment, it is to be understood that many other possible modifications and variations can be made without departing from the spirit and scope of the invention as hereinafter claimed.

What is claimed is:

1. A coupling structure coupled between a base and a display panel for enabling said display panel to be rotatable relative to said base, the coupling structure comprising:
   a pivot structure, said pivot structure fixedly fastened to a top side of said base;
   a rotary platform, said rotary platform comprising a pivot member pivotally coupled to said pivot structure for allowing rotation of said rotary platform on said pivot structure, an open chamber, and a guide structure;
   a gear set arranged inside the open chamber of said rotary platform, said gear set comprising a center gear coaxially fixedly fastened to said pivot structure, a left-side gear pivotally mounted in said rotary platform and meshed with said center gear at one side, and a right-side gear pivotally mounted in said rotary platform and meshed with said center gear at one side opposite to said left-side gear, said left-side gear and said right-side gear having the same number of teeth, at least one of said left-side gear and said right-side gear having a raised portion; and
   a hinge member received inside the open chamber of said rotary platform and fixedly fastened to said display panel, said hinge member having at least one elongated blind hole disposed in a bottom face thereof and coupled to the at least one raised portion at said left-side gear and said right-side gear, and a guide structure coupled to the guide structure of said rotary platform;

wherein when rotating said rotary platform on said pivot structure, said center gear drives said left-side gear and said right-side gear to rotate around said center gear, thereby causing said at least one raised portion to drive the at least one elongated blind hole of said hinge member to move along the guidance of the guide structure of said hinge member and the guide structure of said rotary platform.

2. The coupling structure as claimed in claim 1, wherein said pivot structure is fixedly fastened to a rear side of the top side of said base.

3. The coupling structure as claimed in claim 1, wherein said pivot structure is a pivot shaft, and the pivot member of said rotary platform is a barrel sleeved onto said pivot shaft.

4. The coupling structure as claimed in claim 1, wherein the guide structure of said rotary platform comprises two ribs arranged in parallel inside said open chamber at two sides relative to said gear set; the guide structure of said hinge member comprises two sliding grooves respectively coupled to the ribs of the guide structure of said rotary platform.

5. The coupling structure as claimed in claim 1, wherein the guide structure of said rotary platform comprises two guide rods arranged in parallel inside said open chamber; the guide structure of said hinge member comprises two axle holes respectively coupled to said guide rods for guiding movement of said hinge member along said guide rods.

6. The coupling structure as claimed in claim 1, further comprising a gear damper covered on said rotary platform over said gear set, said gear damper comprising at least one arched sliding slot respectively coupled to said at least one raised portion.

7. The coupling structure as claimed in claim 1, further comprising at least one positioning wheel mounted in the top side of said base, and two locating holes formed in said rotary platform in two opposite sides optionally corresponding to said at least one positioning wheel for positioning.

* * * * *